United States Patent [19]

Honaga et al.

[11] Patent Number: 6,041,807
[45] Date of Patent: Mar. 28, 2000

[54] FLOW CONTROL DEVICE OF POWER STEERING APPARATUS

[75] Inventors: Susumu Honaga; Hidetoshi Fujiwara, both of Aichi-ken; Yoshiharu Inaguma, Nagoya; Hideya Kato, Okazaki; Kazuhiro Watanabe, Nagoya; Takashi Imanishi, Okazaki, all of Japan

[73] Assignee: Toyoda Koki Kabushiki Kaisha, Kariya, Japan

[21] Appl. No.: 09/057,550

[22] Filed: Apr. 9, 1998

[30] Foreign Application Priority Data

| Apr. 9, 1997 | [JP] | Japan | 9-091028 |
| Sep. 30, 1997 | [JP] | Japan | 9-266250 |
| Oct. 2, 1997 | [JP] | Japan | 9-269541 |

[51] Int. Cl.$^7$ ............................ G05D 11/03
[52] U.S. Cl. .................... 137/115.05; 137/115.07; 137/115.19; 137/549
[58] Field of Search .................. 137/115.01, 115.02, 137/115.03, 115.04, 115.05, 115.06, 115.19, 549

[56] References Cited

U.S. PATENT DOCUMENTS

| 3,915,186 | 10/1975 | Thomas | 137/115.06 |
| 4,182,354 | 1/1980 | Bergstedt | 137/115.03 |
| 4,917,139 | 4/1990 | Narumi et al. | 137/110 |
| 5,038,822 | 8/1991 | Iwata | 137/115.03 |
| 5,513,672 | 5/1996 | Nguyen | 137/115.06 |
| 5,685,146 | 11/1997 | Takeuchi et al. | 60/468 |

FOREIGN PATENT DOCUMENTS

| 6-278622 | 10/1994 | Japan |
| 8-192758 | 7/1996 | Japan |
| 8-282513 | 10/1996 | Japan |
| 9-39811 | 2/1997 | Japan |

*Primary Examiner*—Stephen M. Hepperle
*Attorney, Agent, or Firm*—Oblon, Spivak, McClelland, Maier & Neustadt, P.C.

[57] ABSTRACT

A flow control device, responsive to the rotational speed of a pump and to load pressure, has a simple structure. And a housing of the flow control device for saving energy can make use of a general pump housing not for saving energy as a common housing.

The flow control device of a power steering apparatus, arranged in a housing of a pump, includes a flow control valve and a load pressure responsive valve. The flow control valve includes a bypass spool with a control rod penetrating a metering orifice. The load pressure responsive valve is incorporated in a union for response to the load pressure. The control rod is located on the bypass spool for response to the rotational speed of the pump.

9 Claims, 14 Drawing Sheets

FIG. 5
(a)
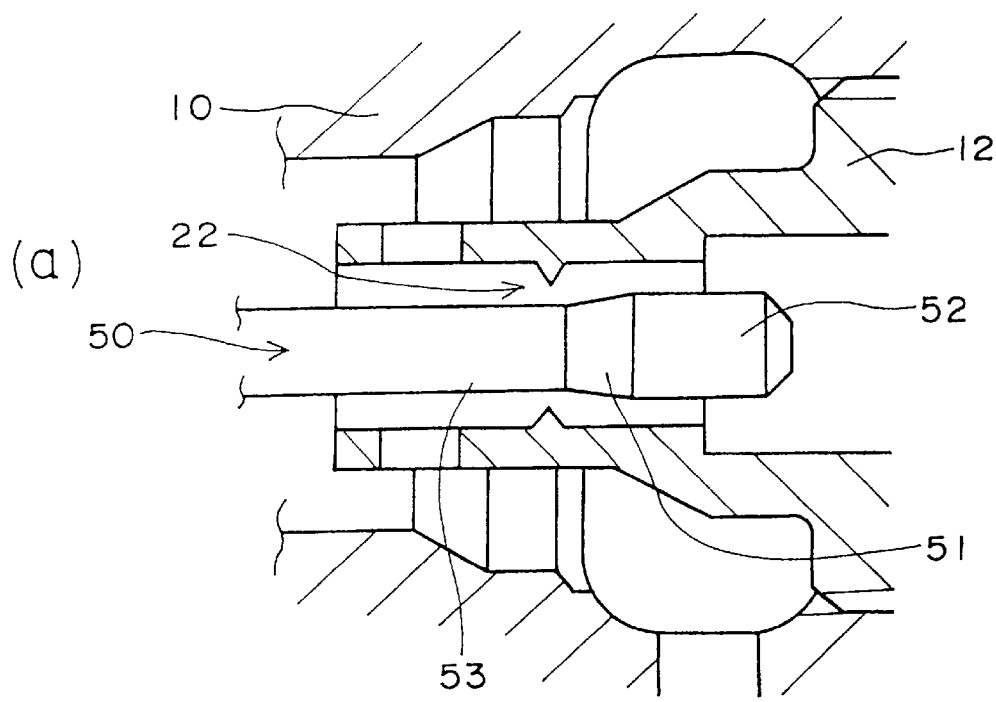
(b)
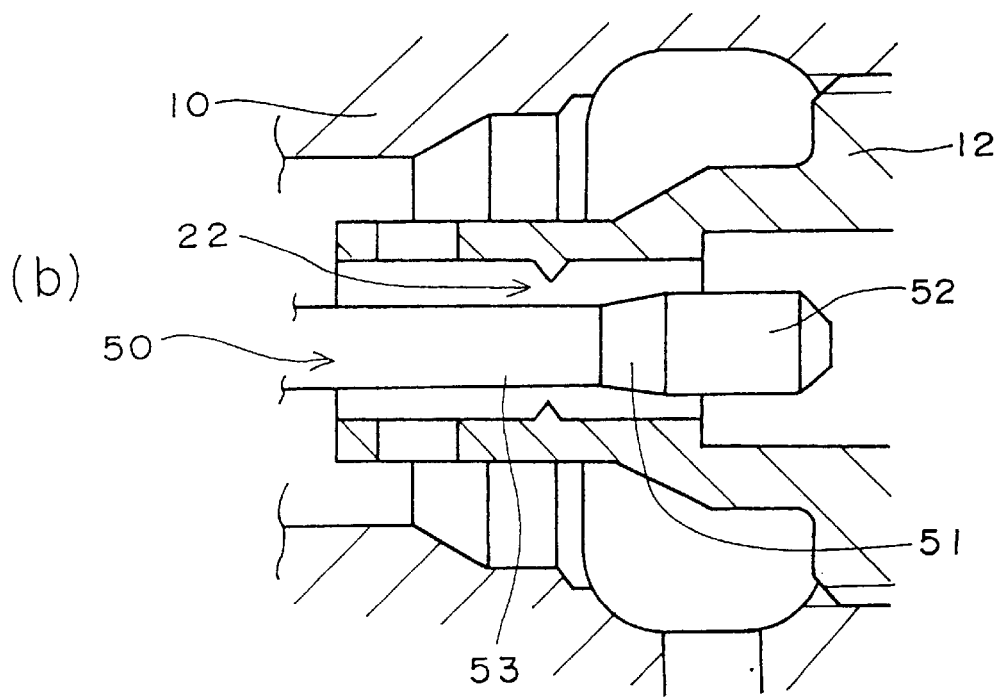

FIG. 6
(a)
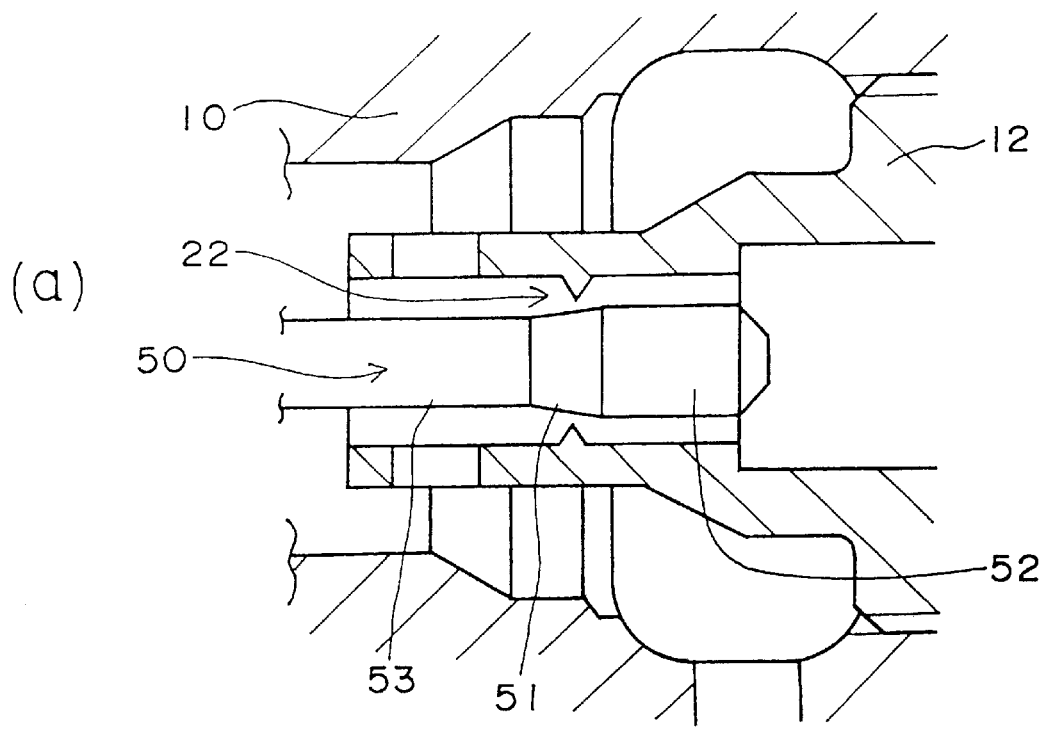
(b)
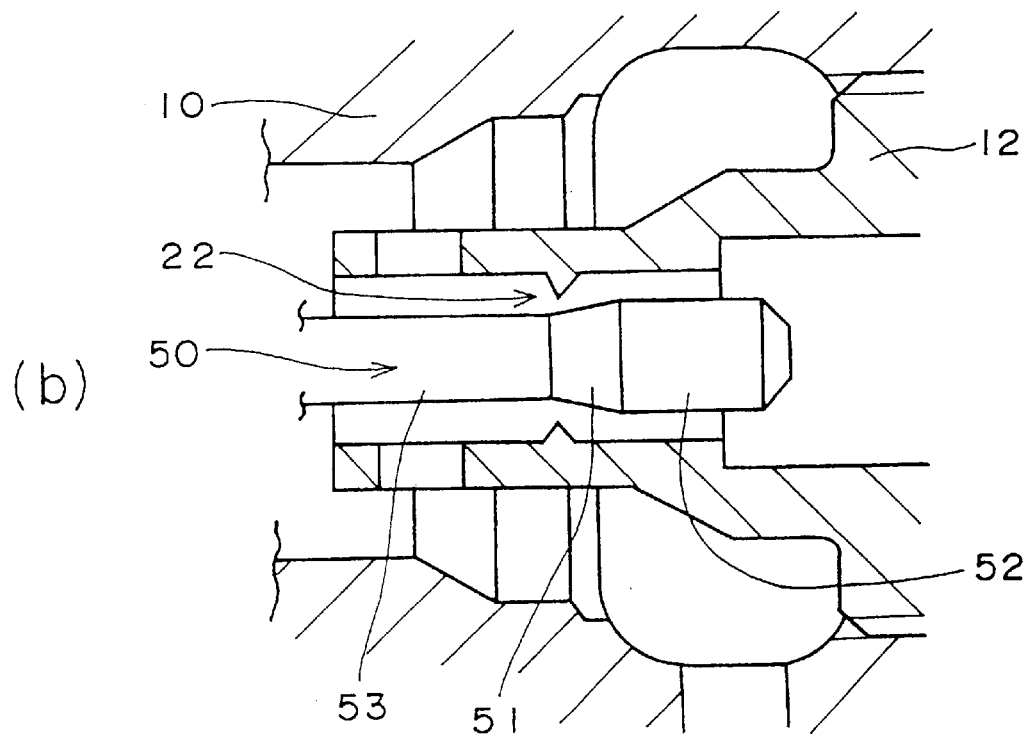

FIG. 7
(a)
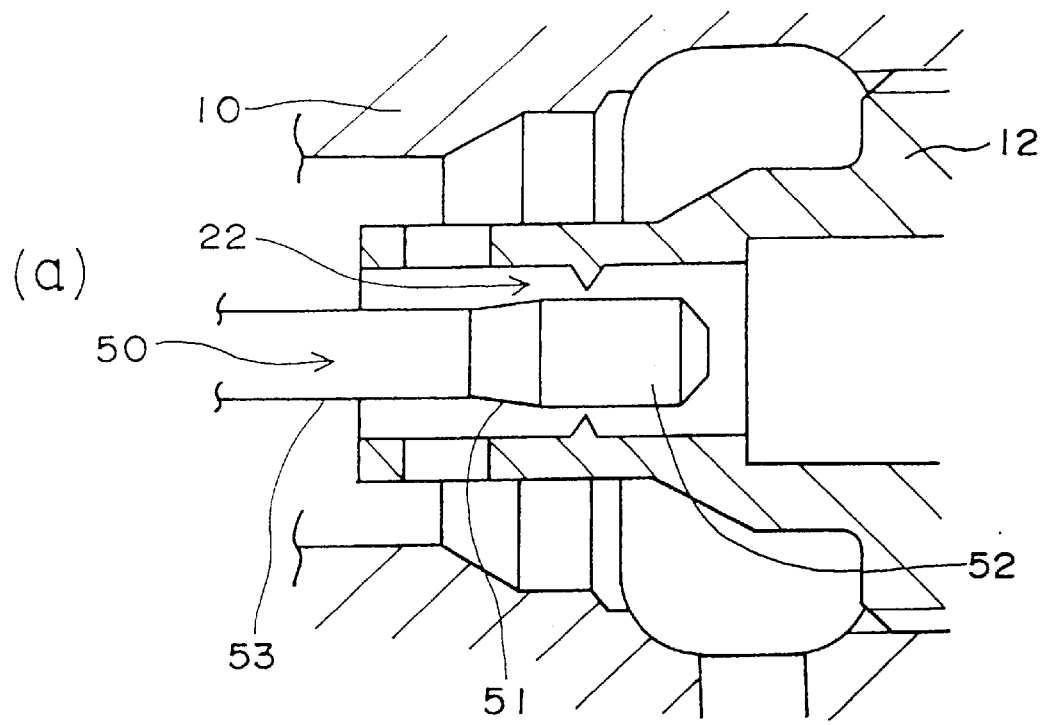
(b)
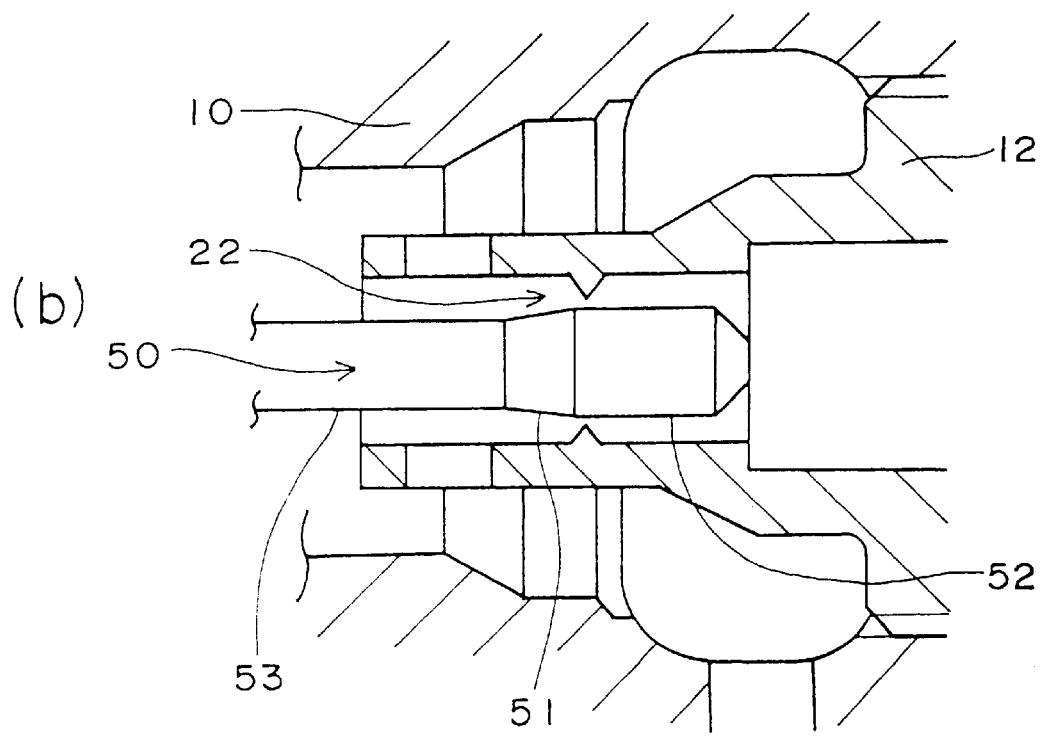

FLOW CONTROL DEVICE OF POWER STEERING APPARATUS

BACKGROUND OF THE INVENTION

1. Field of the Invention

The present invention relates to a flow control device of a power steering apparatus suitable for use in vehicles and the like. More particularly, the present invention relates to a flow control device of a power steering apparatus capable of saving energy by decreasing flow rate of operating fluid supplied from a pump to a control valve at low load pressure.

2. Description of the Prior Art

Flow control devices of power steering apparatuses have been proposed for saving energy of vehicle engine and for providing rigidity of steering operation. The energy of vehicle engine is saved by decreasing flow rate of operating fluid supplied from a pump to a control valve when load pressure caused by rotation of a steering wheel is low, i.e., the steering wheel is not rotated. The rigidity of steering operation is provided by restricting the flow rate when the pump is driven at very high speed, i.e., the vehicle runs at very high speed.

An example of the flow control device is shown in the Japanese Unexamined Patent Publication No. 8-282513. The flow control device has an energy saving mechanism acting in accordance with the load pressure. The energy saving mechanism includes a movable member located behind a bypass spool through a spring urging the bypass spool. The bypass spool has a control rod for regulating an opening area of a metering orifice.

Since the movable member is slid toward the bypass spool by a rise of the load pressure, initial load of the spring is increased, so that the bypass spool is slid to increase the flow rate supplied to a control valve. The rise of the flow rate causes assistance force for a power steering apparatus when the steering wheel is rotated. Therefore, the energy saving mechanism decreases the flow rate supplied to the control valve for saving energy of a vehicle engine, since the movable member is slid in response to the load pressure.

However, the flow control device with the energy saving mechanism involves some drawbacks described hereinafter. The flow control device needs a special housing different from a general housing of a general flow control device with no energy saving mechanism because the energy saving mechanism is located behind the bypass spool in the flow control device for saving the energy. Die to the special housing, the cost of the flow control device with the energy saving mechanism is relatively high.

In addition, it is difficult to decide the spring constant of the spring arranged between the bypass spool and the movable member, since the stiffness of the spring is changed by the movable member slid by the load pressure.

SUMMARY OF THE INVENTION

Accordingly, it is an object of the present invention to provide an improved flow control device, responsive to the rotational speed of the pump and to the load pressure, having a simple structure.

Another object of the present invention is to provide an improved flow control device for saving energy, a housing of which can make use of a general pump housing not for saving energy as a common housing.

A flow control device of a power steering apparatus, arranged in a housing of a pump, includes a flow control valve and a load pressure responsive valve. The housing has a valve receiving bore connecting to a supply passage leading operating fluid discharged from the pump. The valve receiving bore has the flow control valve and a union. The union includes the load pressure responsive valve and a union bore having a metering orifice.

The flow control valve has a spring chamber and a bypass spool for regulating an opening area of a bypass passage in accordance with pressure difference across the metering orifice. The spring chamber is connected to a downstream side of said metering orifice in said union bore and connected to a reservoir. The bypass spool is urged by a spring in the spring chamber and has a control rod penetrating the metering orifice for regulating an opening area of the metering orifice in accordance with a movement of the bypass spool.

The load pressure responsive valve regulates communication between the spring chamber and the reservoir in response to a rise of the load pressure of operating fluid.

In the flow control device described above, the load pressure of the operating fluid increases when a steering wheel is rotated. Since the load pressure responsive valve restricts the communication between the spring chamber and the reservoir in response to a rise of the load pressure, the pressure of the spring chamber rises to move the bypass spool, so that the flow rate of the operating fluid is increased to generate assistance force of the power steering apparatus.

The bypass spool is moved in response to the rise of the flow rate changed in accordance with rotational speed of the pump. The control rod of the bypass spool regulates the opening area of the metering orifice with the movement of the bypass spool. Therefore, the flow control valve regulates the flow rate in accordance with not only the load pressure but also the rotational speed of the pump.

To produce the flow control device, the housing of the flow control device can make use of the general housing with no response to the load pressure and the rotational speed of the pump. The reason that the flow control device only requires improvement of the union and the bypass spool because the flow control valve needs the load pressure responsive valve incorporated in the union for response to the load pressure and the control rod located on the bypass spool for response to the rotational speed of the pump.

In preferable construction, the load pressure responsive spool is urged by a spring toward the metering orifice. The flow control device with this construction prevents shortage of the assistance force in cold temperature state. In cold temperature state such as cold area, since the coefficient of viscosity of the operating fluid increases, the operating fluid generates additional force to move the load pressure responsive spool. However, the additional force acts to decrease the communication between the spring chamber and the reservoir regardless of the temperature. Therefore, the flow rate for generating the assistance force of the power steering is sufficiently originated even when the flow control device is in cold temperature state.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 5 is an enlarged sectional view of a control rod at low rotational speed of a pump;

FIG. 6 is an enlarged sectional view of the control rod at middle rotational speed of the pump;

FIG. 7 is an enlarged sectional view of the control rod at high rotational speed of the pump;

DETAILED DESCRIPTION OF THE PREFERRED EMBODIMENT

[First Embodiment]

A first embodiment of the present invention is described with reference to the accompanying drawings.

Figure 1:
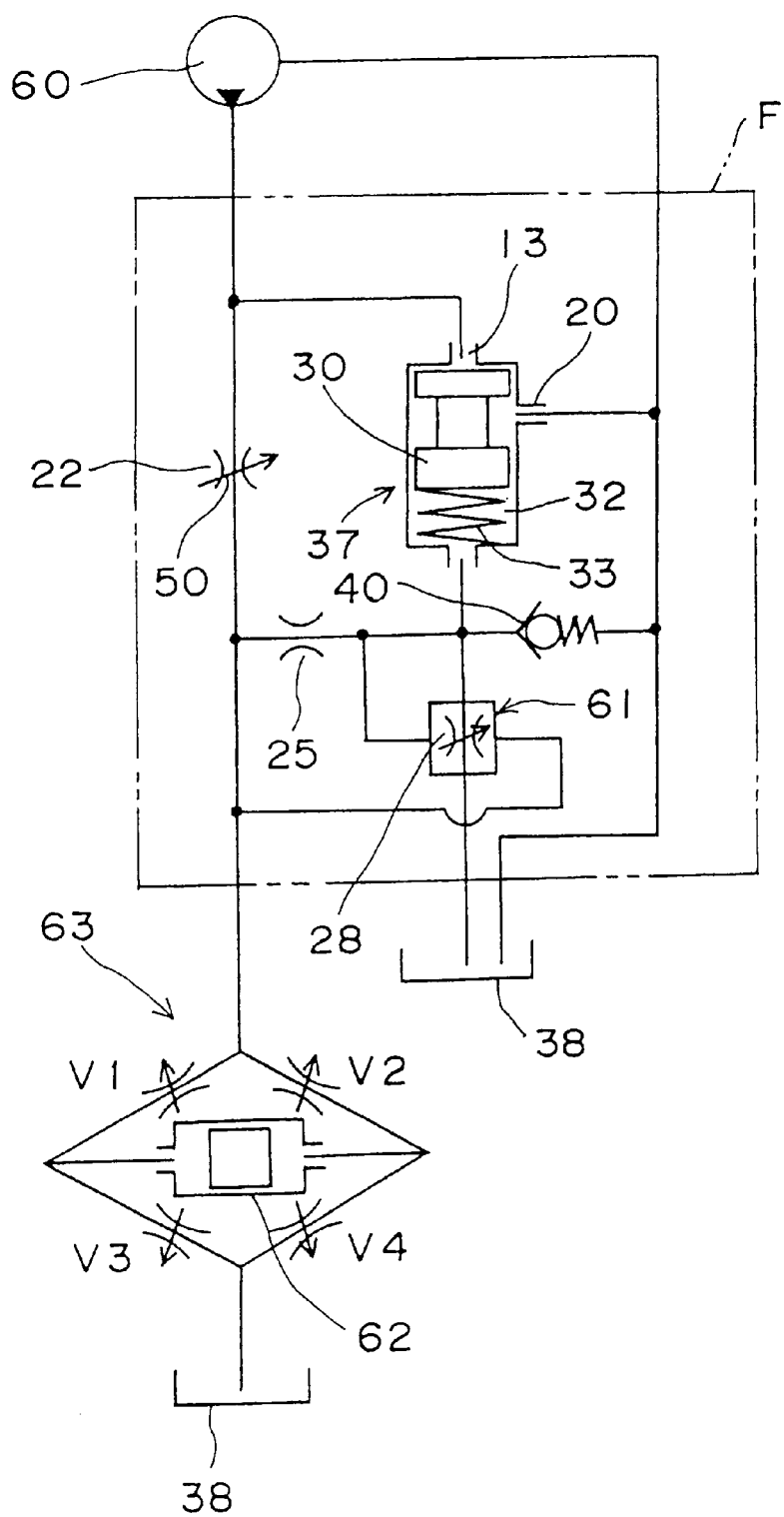
FIG. 1 is an overall structure of a flow control device of a power steering apparatus.

FIG. 1 is an overall structure of a hydraulic power steering apparatus according to the present invention. The hydraulic power steering apparatus is mainly composed of a pump 60 driven by an automotive engine not shown, a reservoir 38, a power cylinder 62 to assist steering wheel operation, a rotary-type control valve 63 to control flow rate of operating fluid discharged from the pump 60 to the power cylinder 62 in accordance with rotation of a steering wheel. The pump 60 includes a housing 10 having a flow control device F.

As shown in a schematic illustration of FIG. 1, the control valve 63 includes four variable throttles V1, V2, V3 and V4 of center-open type disposed in fluid paths. The fluid paths with the variable throttles V1 and V2 are respectively connected to the pump 60 and both the fluid chambers of the power cylinder 62. The fluid paths with the variable throttles V3 and V4 are respectively connected to both the fluid chambers of the power cylinder 62 and the reservoir 38.

Figure 2:
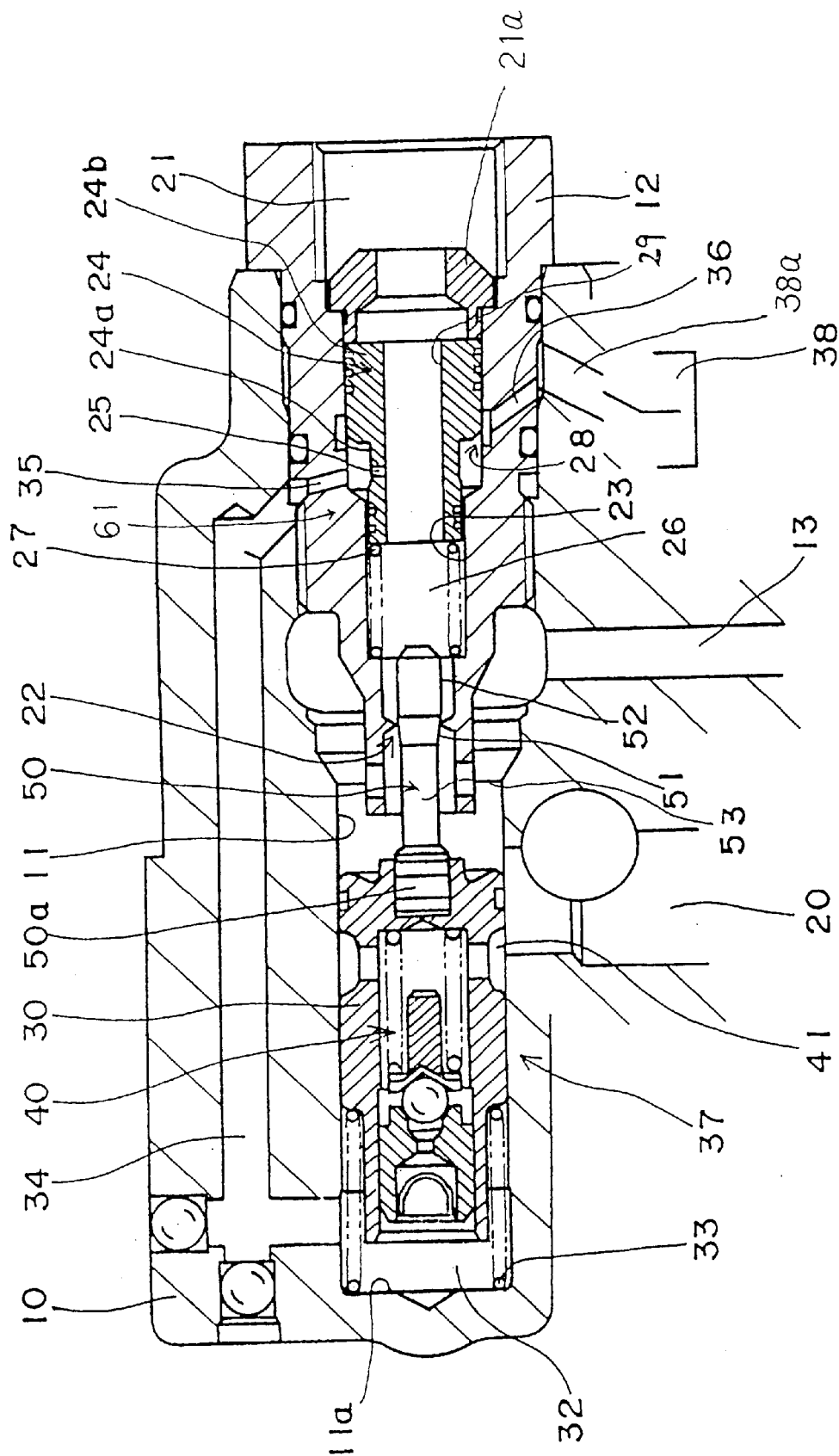
FIG. 2 is a sectional view of the flow control device in low load pressure state.

The flow control device F is shown in FIG. 2. A valve receiving bore 11 is formed in the housing 10 of the pump 60. A union 12 is screwed into an opening of the valve receiving bore 11 with a seal. A supply passage 13 and a bypass passage 20 are connected to the valve receiving bore 11, respectively. The supply passage 13 and the bypass passage 20 are spaced in axial direction of the valve receiving bore 11. The supply passage 13 is connected to a discharged port of the pump 60. The bypass passage 20 is connected to a suction port of the pump 60.

The union 12 has a cylindrical shape with a union bore coaxially corresponding to the valve receiving bore 11. In each end of the union 12, an outlet port 21 and a metering orifice 22 are formed, respectively. The outlet port 21 is connected to an inlet port of the control valve 63. A seat 21a is fixed in the outlet port 21. The metering orifice 22 is arranged to communicate with the supply passage 13.

Figure 4:
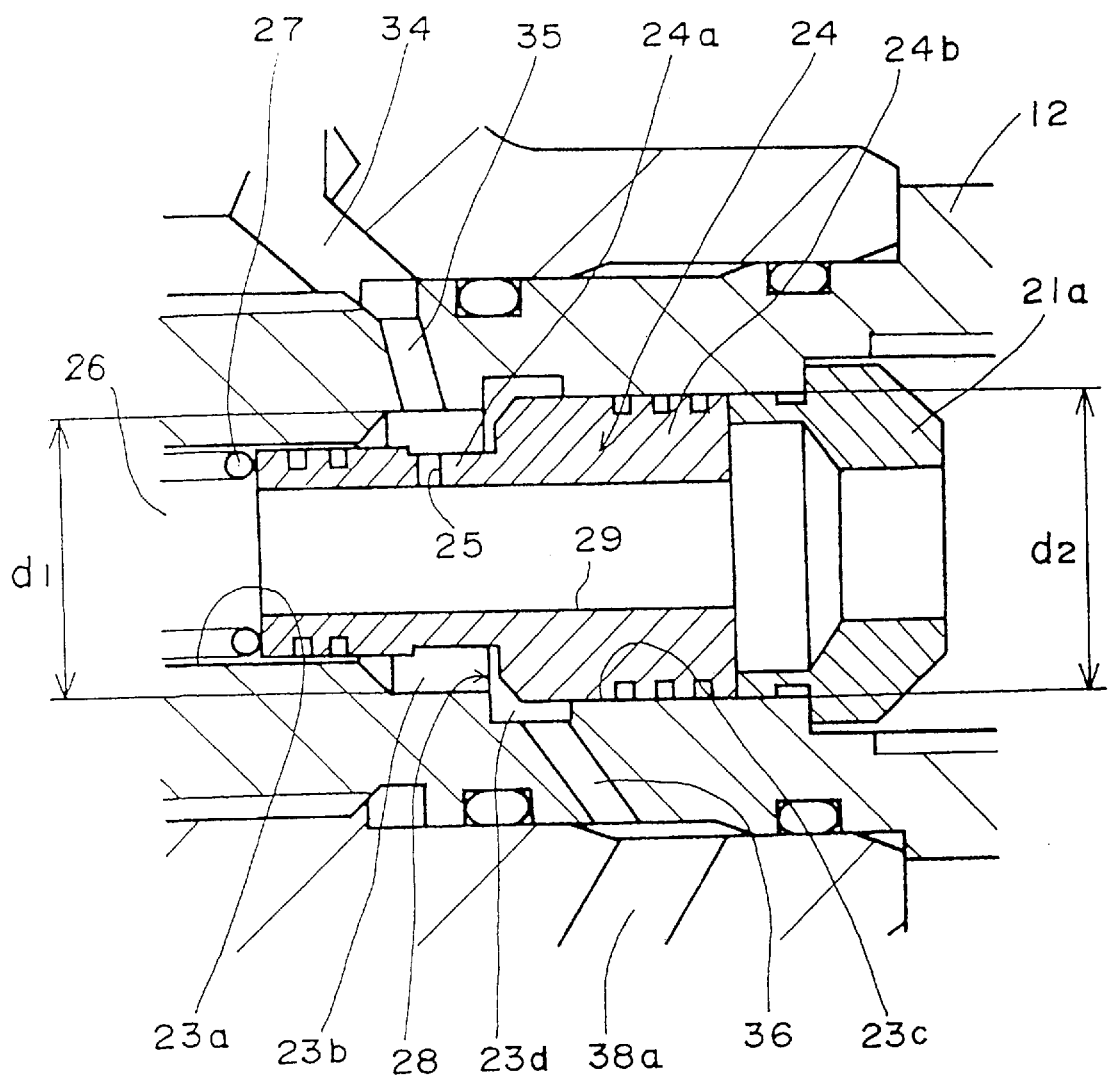
FIG. 4 is an enlarged sectional view of a load pressure responsive valve.

In the union 12, a stepped bore 23 is formed between the outlet port 21 and the metering orifice 22 in the union bore. The stepped bore 23 consists of a small bore 23a, a middle bore 23b and a large bore 23c coaxially formed from the metering orifice 22 in this order as shown in FIG. 4. The diameter of the bores 23a, 23b and 23c become larger in this order. An inner groove 23d is formed between the middle bore 23b and the large bore 23c, and the diameter of the inner groove 23d is larger than that of the large bore 23c.

The stepped bore 23 slidably receives a load pressure responsive spool 24 (hereinafter referred to as a responsive spool 24) within a certain stroke of distance. The union 12 and the responsive spool 24 constitute a load pressure responsive valve 61 (hereinafter referred to as a responsive valve 61).

A bypass spool 30, arranged next to the union 12, is slidably received in the valve receiving bore 11 to control flow rate of operating fluid supplied to the control valve 63. A spring chamber 32 is formed between one end of the bypass spool 30 and the end portion 11a of the valve receiving bore 11. The spring chamber 32 contains a spring 33 urging the bypass spool 30 toward the union 12 to narrow an opening area of the bypass passage 20, so that communication between the supply passage 13 and the bypass passage 20 is regulated.

The spring chamber 32 is connected to the outlet port 21 through a connection passage 34, a pressure introducing passage 35 and a control orifice 25. The connection passage 34 is formed in the housing 10 to connect between the spring chamber 32 and the pressure introducing passage 35. The pressure introducing passage 35 is formed in the union 12 to penetrate to the stepped bore 23 of the union 12. The control orifice 25 is formed in the responsive spool 24 to penetrate to a through hole 29 of the responsive spool 24. The through hole 29 formed in the responsive spool 24 connects between the metering orifice 22 and the outlet port 21.

In the above connection, differential pressure across the metering orifice 22 acts he bypass spool 30, i.e., the pressure before the metering orifice 22 acts on the right end of the bypass spool 30 and the pressure passed through the metering orifice 22 acts on the left end of the bypass spool 30. Therefore, the bypass spool 30 adjusts the opening area of the bypass passage 20 to maintain the differential pressure across the metering orifice 22 constant. The metering orifice 22, the bypass spool 30 and the spring 33 constitute a flow control valve 37.

In the responsive valve 61, the responsive spool 24 consists of a small spool portion 24a and a large spool portion 24b, the diameter of which is larger than that of the small spool portion 24a. The small spool portion 24a is supported in the small bore 23a of the union 12, and the large spool portion 24b is supported in the large bore 23c of the union 12.

The pressure introduction port 35 formed in the union 12 faces the small spool portion 24a of the responsive spool 24 in the middle bore 23b, and the pressure introduction port 35 is connected to the connection passage 34. In addition, a pressure exhaust port 36 is formed in the union 12 to be connected to the reservoir 38 through a release path 38a formed in the housing 10. The opening of the pressure exhaust port 36 is located in the inner groove 23d of the union 23. The inner groove 23d faces a shoulder formed by the small spool portion 24a and the large spool portion 24b of the responsive spool 24. The shoulder and the inner groove 23d, i.e., the opening area of the pressure exhaust port 36, constitute a variable orifice 28.

A spring chamber 26 is formed between the responsive spool 24 and the union 12, i.e., in the small bore 23a. The spring chamber has a spring 27 urging the responsive spool 24 toward the seat 21a, so that the responsive spool 24 is contacted with the seat 21a. When the responsive spool 24 is contacted with the seat 21a, the variable orifice 28 is completely open, and the pressure introduction port 35 and the pressure exhaust port 36 are communicated each other.

When the pressure introduction port 35 and the pressure exhaust port 36 are connected through the variable orifice 28, the operating fluid, which has passed through the metering orifice 22, is supplied to the spring chamber 32 through the control orifice 25, the pressure introduction port 35 and the connection passage 34. At the same time, the operating fluid is drained to the reservoir 38 through the control orifice 25, the pressure exhaust port 36 and the release path 38a. Therefore, the responsive spool 24 is acted by two opposite hydraulic propulsion. One is rightward hydraulic propulsion f1 caused by pressure Pa of the operating fluid passing through the control orifice 25 in the middle bore 23b in FIG. 2. The other is leftward hydraulic propulsion f2 caused by pressure Pb of the operating fluid in the outlet port 21.

In this state, a total rightward propulsion F1 and a total leftward propulsion F2, acting responsive spool 24, are expressed by the following formulas.

$$F1 = f1 + Fs = A1 \cdot Pa +$$

$$F2 = f2 = A2 \cdot Pb$$

In the formulas, A1 shows an effective pressure receiving area on which the rightward hydraulic propulsion f1 acts. A2 shows an effective pressure receiving area on which the leftward hydraulic propulsion f2 acts. Fs shows spring force of the spring 27. Since the diameter d1 of the middle bore 23b of the stepped bore 23b is smaller than the diameter d2 of the large spool portion 24b of the responsive spool 24, the effective pressure receiving area A1 is smaller than the effective pressure receiving area A2.

When the load pressure is relatively low, since difference between the hydraulic propulsions $f1(=A1 \cdot Pa)$ and $f2(=A2 \cdot Pb)$ acting the responsive spool 24 is relatively small and the spring force Fs of the spring 27 acts rightward, the following relation is established.

$$F1(=A1 \cdot Pa + Fs) > F2(=A2 \cdot Pb)$$

However, when the load pressure, i.e., the pressure Pb, increases, since the difference between the hydraulic propulsions f1 and f2 increases on the basis of the area difference between the pressure receiving areas A1 and A2, the above relationship changes as follows.

$$F1(=A1 \cdot Pa + Fs) < F2(=A2 \cdot Pb)$$

Therefore, the responsive spool 24 moves leftward against the spring force of the spring 27, decreasing the opening area of the variable orifice 28.

The bypass spool 30 accommodates a relief valve 40 to release pressure in the spring chamber 32 to the bypass passage 20 through a drain passage 41 formed in the bypass spool 30 when the pressure in the spring chamber 32 exceeds a preset pressure.

The bypass spool 30 has a control rod 50 consisting of a fixed portion 50a, a small diameter portion 53, a taper portion 51 and a large diameter portion 52 inseparably formed in this order. The fixed portion 50a, i.e., one end of the control rod 50, is fixed on the end of the bypass spool 30. The other end of the control rod 50 penetrates the metering orifice 22. The diameter of the large diameter portion 52 is larger than that of small diameter portion 53. The diameters of the small diameter portion 53 and the large diameter portion 52, and a slope of the taper portion 51, each of which defines the opening area of the metering orifice 22, are predetermined on the basis of examinations.

An opening area of the metering orifice 22 is changed by the position of the control rod 50 to the metering orifice 22, since the bypass spool 30 is gradually separated from the metering orifice 22 in accordance with increasing rotational speed of the pump 60, i.e., speed of a vehicle with the flow control device. When the small diameter portion 53 of the control rod 50 is located in the metering orifice 22 (i.e. the vehicle speed is low), the opening area of the metering orifice 22 is maximized. When the taper portion 51 is located in the metering orifice 22 (i.e. the vehicle speed is middle), the opening area of the metering orifice 22 is decreased in accordance with the slide of the control rod 50 from the small diameter portion 53 to the large diameter portion 52. When the large diameter portion 52 of the control rod 50 is located in the metering orifice 22 (i.e. the vehicle speed is high), the opening area of the metering orifice 22 is minimized. In this state, the flow rate of the operating fluid supplied to the control valve 63 is minimized.

The operation of the flow control device as constructed above is described. When the pump 60 is driven by the automotive engine, the operating fluid is supplied from the discharged port of the pump 60 to the supply passage 13. The operating fluid discharged to the supply passage 13 passes through the metering orifice 22, the opening area of which is regulated by the control rod 50 of the bypass spool 30. Then, the operating fluid is supplied from the outlet port 21 to the control valve 63. At the same time, the operating fluid, which has passed through the metering orifice 22, is introduced into the spring chamber 32 through the control orifice 25, the pressure introducing passage 35 and the connection passage 34. And also, the operating fluid is discharged to the reservoir 38 through the pressure exhaust port 36 and the release path 38a. Therefore, since the differential pressure across the metering orifice 22 acts on the bypass spool 30, the opening of the bypass passage 20 is adjusted to maintain the differential pressure constant so as to keep the flow rate of the operating fluid supplied from pump 60 to the control valve 63 constant.

When an unillustrated steering wheel is substantially in its neutral state, the operating fluid supplied to the control valve 63 is equally drained from the variable throttles V1 and V2 to the reservoir 38 through the variable throttles V3 and V4. Therefore, the pressure in each chamber of the power cylinder 62 is equally maintained low.

On this condition, since the load pressure is relatively low, the difference between the hydraulic propulsions f1 and f2 acting on the both ends of the responsive spool 24 is small. Therefore, the responsive spool 24 is maintained on the sliding end with contacting with the seat 21a of the union 21 by the spring 27, so that the variable orifice 28 is completely open. Due to the opening of the variable orifice 28, the pressure introducing passage 35 and the pressure exhaust port 36 are connected to release the pressure in the spring chamber 32 to the low-pressure side, i.e., the reservoir 38 through the variable orifice 28. Since the pilot fluid rate is released from the spring chamber 32 to the low-pressure side, the bypass spool 30 is displaced to open the opening area of the bypass passage 20. Accordingly, the operating fluid discharged from the pump 60 is mostly bypassed to the suction port of the pump 60 through the bypass passage 20 for saving energy.

In this state, the opening area of the metering orifice 22 is changed by the flow rate of the operating fluid discharged from pump 60 to the supply passage 13 because the control rod 50 of the bypass spool 30 moves in accordance with the flow rate. The flow rate depends on the rotational speed of the pump 60 driven by the vehicle engine. In general, since the pump 60 is driven at high rotational speed on condition that the vehicle runs at high speed, the flow rate of the pump 60 increases in accordance with the rise of the vehicle speed.

In the low load pressure state with no substantial rotation of the steering wheel, when the vehicle runs at low speed, the small diameter portion 53 of the control rod 50 of the bypass spool 30 is located on the metering orifice 22 as shown in FIG. 5(a). Since the flow rate of the pump 60 increases in accordance with the rise of the vehicle speed, the bypass spool 30 is gradually slid leftward against the force of the spring 33 in FIG. 2 to increase the flow rate of the operating fluid released to the reservoir 33. Due to the slide of the bypass spool 30, the control rod 50 of the bypass spool 30 is also moved leftward.

When the vehicle speed is increased at middle speed, the taper portion 51 of the control rod 50 is located on the metering orifice 22 as shown in FIG. 6(a). While the bypass spool 30 is moved with the taper portion 51 located on the metering orifice 22, the opening area of the metering orifice 22 is gradually decreased in accordance with the rise of the flow rate of the operating fluid discharged from the supply passage 13. The change of the opening area of the metering orifice 22 gradually decreases the flow rate of the operating fluid supplied to the control valve 63.

When the vehicle speed is further increased at the high speed from the middle speed, the large diameter portion 52 of the control rod 50 is located on the metering orifice 22 as shown in FIG. 7(a). Since the large diameter portion 52 minimizes the opening area of the metering orifice 22, the flow rate of the operating fluid supplied to the control valve 63 is minimized.

Figure 8:
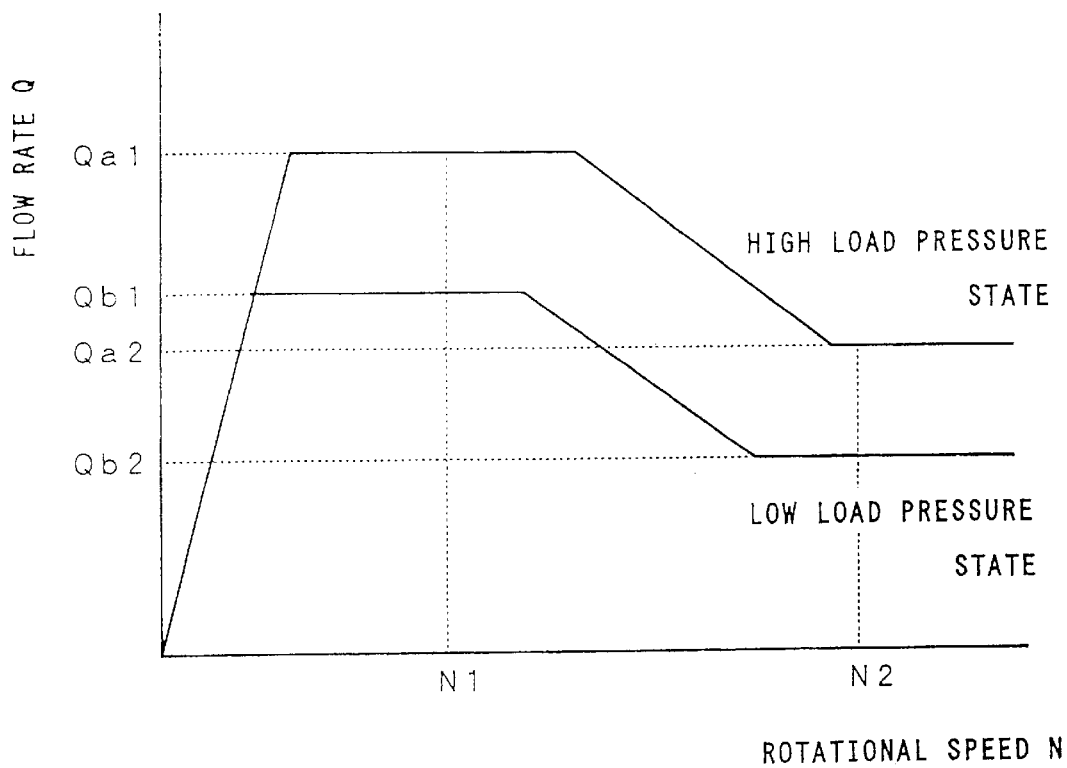
FIG. 8 is a graph showing a relationship between rotational speed N of the pump and flow rate Q.

As shown in FIG. 8, when the vehicle runs at low speed, i.e., the rotational speed of the pump 60 is approximately N1, the flow rate is maintained at Qb1 by the small diameter portion 53 of the control rod 50. When the vehicle runs at high speed, i.e., the rotational speed of the pump 60 is approximately N2, the flow rate is decreased, maintained at Qb2 by the large diameter portion 52 of the control rod 50. This shows the drooping characteristic in the low load pressure state.

According as the steering wheel is rotated, one pair of variable throttles V1, V3 and V2, V4 is gradually open and the other pair simultaneously close in accordance with the rotational direction thereof, whereby the load pressure is increased. This causes the differential pressure between both the chambers of the power cylinder 62 to generate an assistance force of the power steering apparatus.

Figure 3:
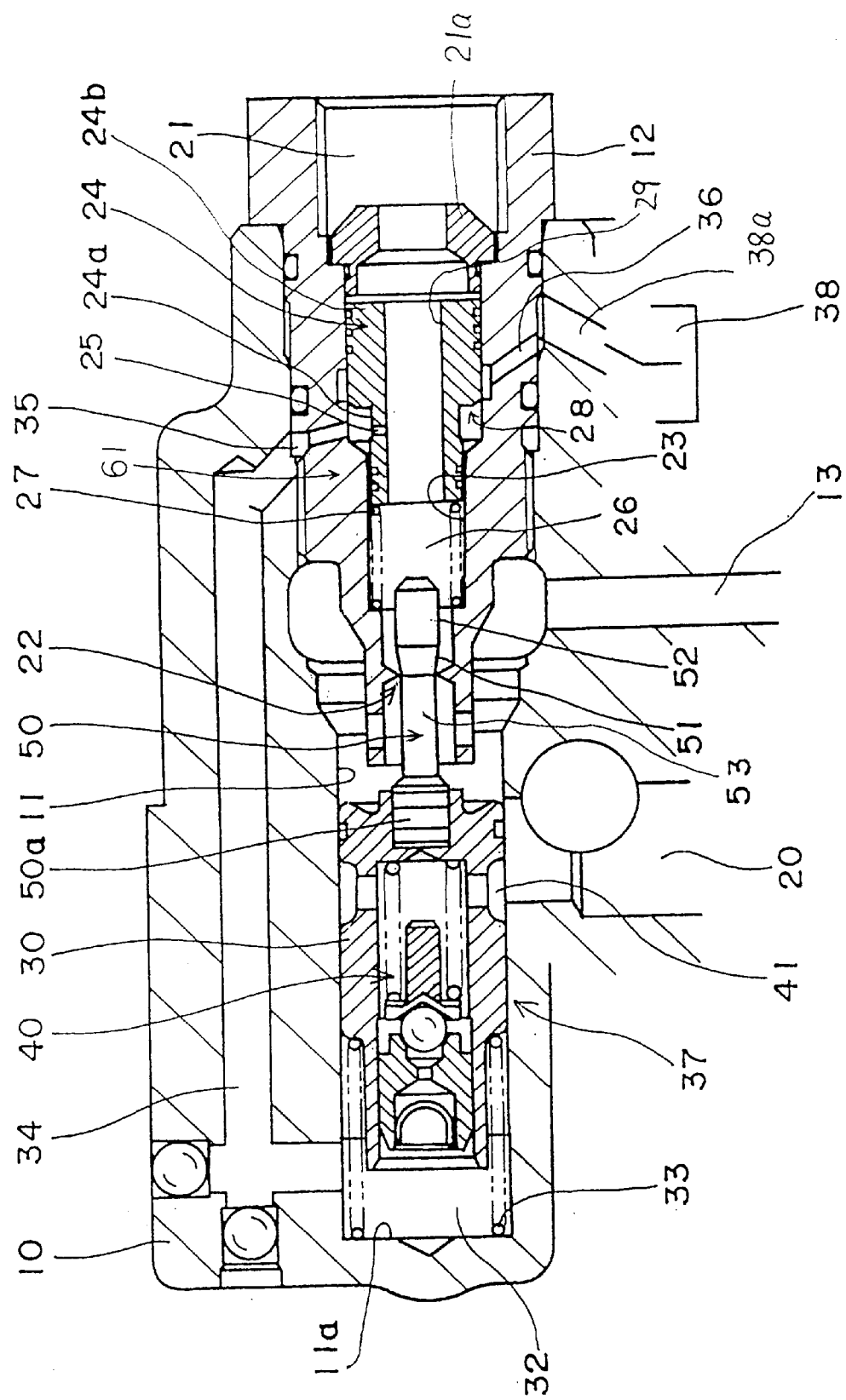
FIG. 3 is a sectional view of the flow control device in high load pressure state.

In accordance with the rise of the load pressure, the leftward hydraulic propulsion f2 is increased. And the difference of the hydraulic propulsions f1 and f2 between both ends of the responsive spool 24 is increased due to the area difference between the pressure receiving areas A1 and A2 of both ends of the responsive spool 24. When the difference of the hydraulic propulsions f1 and f2 exceeds the force Fs of the spring 27, the responsive spool 24 is moved leftward against the spring 27, decreasing the opening area of the variable orifice 28 as shown in FIG. 3. By closing the variable orifice 26, the communication between the pressure introduction port 35 and the pressure exhaust port 36 is closed, so that the pilot fluid rate released from the spring chamber 32 to the reservoir 38 is decreased to zero. Therefore, the pressure in the spring chamber 32 increases so that the bypass spool 30 moves to narrow the opening area of the bypass passage 20. As the result, the flow rate of the operating fluid supplied to the control valve 63 increases to generate sufficient assistance force of the power steering apparatus.

In this high load pressure state with the rotation of the steering wheel, when the vehicle runs at low speed, the small diameter portion 53 of the control rod 50 of the bypass spool 30 is located on the metering orifice 22 as shown in FIG. 5(b).

The flow control valve 37 regulates the flow rate of the operating fluid supplying to the control valve 63 constant in the similar way to the low load pressure state. However, since the pressure in the spring chamber 32 in the high load pressure state is larger than that in the low load pressure state, the bypass spool 30 is located rightward compared with the position of low load pressure state, so as to narrow the opening area of the bypass passage 20. Therefore, the control rod 50 of the bypass spool 30 in the high load pressure state is located rightward compared with that in the low load pressure state in the position thereof.

Since the flow rate of the pump 60 increases in accordance with the rise of the vehicle speed, the bypass spool 30 is gradually slid leftward to regulate the flow rate supplying to the control valve 63 constant in the similar way to the low load pressure state. Namely, the bypass spool 30 is gradually slid leftward against the force of the spring 33 in FIG. 3 to increase the flow rate of the operating fluid released to the reservoir 38. Due to the slide of the bypass spool 30, the control rod 50 of the bypass spool 30 is also moved leftward.

In the similar way to the low load pressure state, when the vehicle speed is increased at middle speed, the taper portion 51 of the control rod 50 is located on the metering orifice 22 as shown in FIG. 6(b). And when the vehicle speed is further increased at the high speed from the middle speed, the large diameter portion 52 of the control rod 50 is located on the metering orifice 22 as shown in FIG. 7(b), Since the bypass spool 30 in the high load pressure state is located rightward compared with that in the low load pressure state in the position thereof, the vehicle speed, i.e. the rotational speed of the pump 60, for transferring from the small diameter portion 53 to the taper portion 51 of the control rod 50 is higher than that of the low load pressure state. In the same reason, the vehicle speed for transferring from the taper portion 51 to the large diameter portion 52 is higher than that of the low load pressure state.

As described above, as shown in FIG. 8, when the vehicle runs at low speed, i.e., the rotational speed of the pump 60 is approximately N1, the flow rate is maintained at Qa1. When the vehicle runs at high speed, i.e., the rotational speed of the pump 60 is approximately N2, the flow rate is decreased, maintained at Qa2. This shows the drooping characteristic of the high load pressure state. Compared the graph of the high load pressure state with that of the low load pressure state in FIG. 8, the graph of the high load pressure state is shifted in position upward and rightward from the graph of the low load pressure state. FIG. 8 shows that the flow rate of the high load pressure state is larger than that of the low load pressure state at each rotational speed of the pump 60 to generate the assistance force of the power steering apparatus.

In the above-described embodiment, the flow control device has the simple structure containing the load pressure responsive spool 24 received in the union 12 and the bypass spool 30 with the control rod 50. The flow control device is capable of saving energy with no substantial improvement of the housing since the housing 10 makes use of a general housing not for saving energy. Namely, the general housing is possible to be applied as a common housing. In addition, the flow control device is easily assembled because of that simple structure.

The flow control device changes the pressure of the spring chamber 32 for saving energy by the load pressure responsive valve 61 regulating the communication between the spring chamber 32 and the reservoir 38. Therefore, since the flow control device does not need the spring located between the bypass spool 30 and the responsive spool 24 like the conventional flow control device described in the prior art, the flow control device can decrease aged deterioration compared with the conventional flow control device.

The control rod 50 of the flow control device of the first embodiment consists of the small diameter portion 53, the taper portion 51 and the large diameter portion 52. However, the control rod 50 can consist of the small diameter portion 53 and the taper portion 51 with no large diameter portion. Moreover, though the diameter of the taper portion 51 linearly increases from the small diameter portion 53 to the large diameter portion 52, the diameter of the taper portion 51 can curvedly increase. And the taper portion 51 can consist of a plurality of stepped portions to gradually change the diameter thereof. To sum up, the taper portion 51 can have any shape on condition that the opening area of the metering orifice 22 is changed.

[Second Embodiment]

Figure 9:
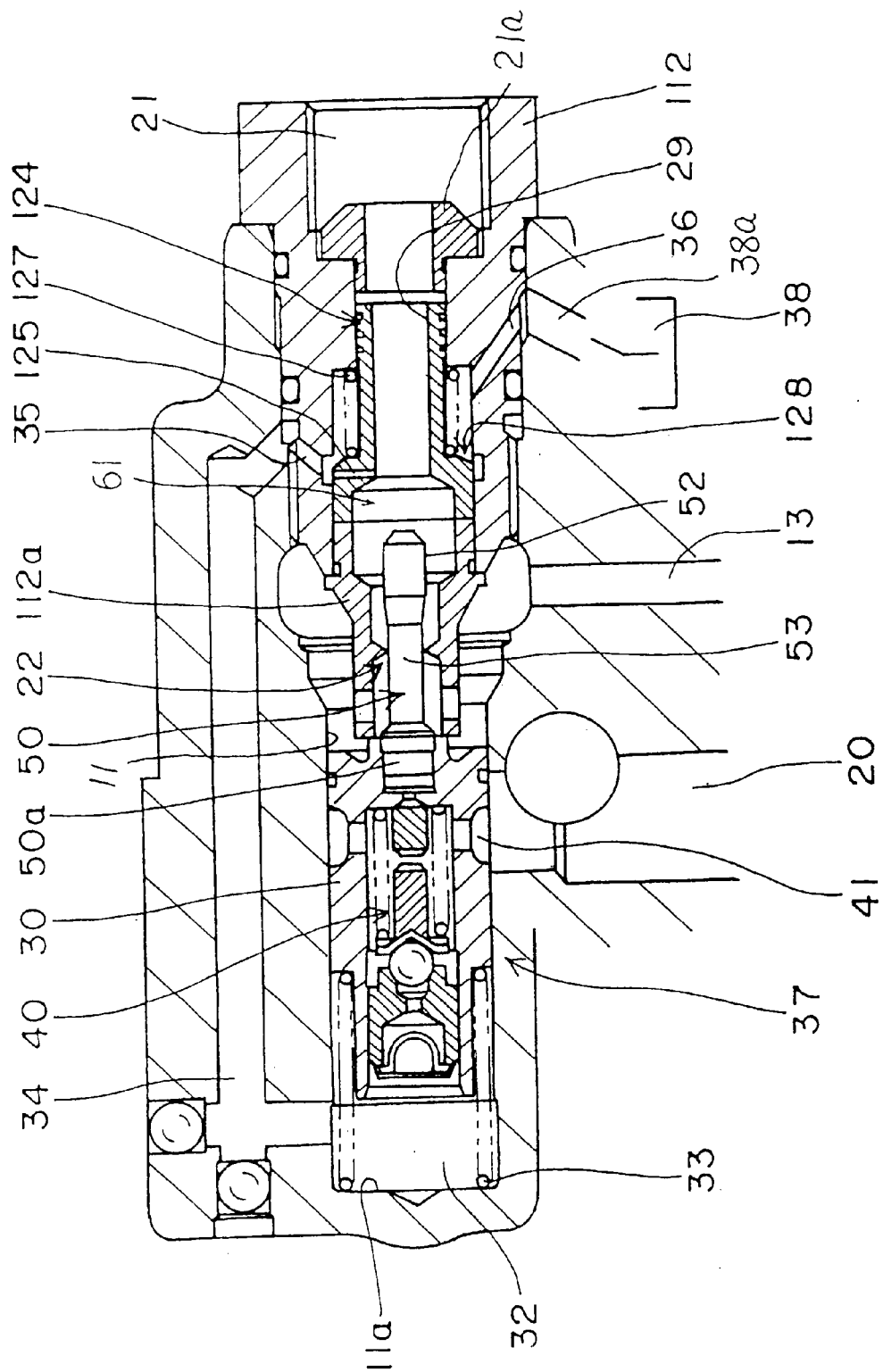
FIG. 9 is a sectional view of a flow control device of a second embodiment.

FIG. 9 shows another preferred embodiment of a flow control device responsive to change in rotational speed of pump and in load pressure. The flow control device is capable of preventing shortage of assistance force for a power steering apparatus at low temperature. The shortage of assistance force is caused by decrease of flow rate supplying to a control valve because coefficient of viscosity of the operating fluid increases at low temperature.

The flow control device shown in FIG. 9 has two significant differences from the first embodiment of the flow control device previously described. FIG. 9 is comparable to FIG. 2 for the first embodiment. Parts of the second embodiment, substantially same as those of the first embodiment, are noted by the same numerals of the first embodiment. Therefore, the description of these parts in the second embodiment is omitted. The other parts of the second embodiment, different from those of the first embodiment, are noted by different reference numerals.

One difference of the second embodiment is that a load pressure responsive spool 124 (hereinafter referred to as a responsive spool 124) is urged toward a metering orifice 22 by a spring 127. The other difference of the second embodiment is that a union 112 consists of two separate elements to accommodate the responsive spool 124 in the union 112. One is a main-body of the union 112 and the other is a sub-body 112a of the union 112 having the metering orifice 22. The sub-body 112a of the union 112 is fitted in the main-body of the union 112 by press fitting.

Since the responsive spool 124 is urged toward a metering orifice 22, an effective pressure receiving area A1' of the responsive spool 124 facing the metering orifice 22 is larger than an effective pressure receiving area A2' facing the outlet port 21. This relationship between the effective pressure receiving areas A1' and A2' is opposite to that of the first embodiment.

When unillustrated steering wheel is substantially in its neutral state, the responsive spool 124 is maintained on the sliding end with contacting with the end of the sub-body 112a of the union 112 by the spring 127, so that the variable orifice 128 is completely open, Due to the opening of the variable orifice 128, the pressure introducing passage 35 and the pressure exhaust port 36 are connected to release the operating fluid, which has passed through the metering orifice 22, to the reservoir 38 through the control orifice 125.

The responsive spool 124 is acted by two opposite hydraulic propulsions. One is rightward hydraulic propulsion f1' caused by pressure Pa' of the operating fluid which has passed through the metering orifice 22 in FIG. 9. The other is leftward hydraulic propulsion f2' caused by pressure Pb' of the operating fluid which has passed through the control orifice 125.

In this state, a total rightward propulsion F1' and a total leftward propulsion F2' are expressed by the following formulas.

$$F1'=f1'=A1'\cdot Pa'$$

$$F2'=f2'+Fs'=A2'\cdot Pb'+Fs'$$

In the formulas, the rightward hydraulic propulsion f1' acts on the pressure receiving area A1'. The leftward hydraulic propulsion f2' acts on the pressure receiving area A2'. Spring force of the spring 127 shows Fs'.

When the load pressure, i.e., the pressure Pa', is relatively low, since difference between the hydraulic propulsions f1'(=A1'·Pa') and f2'(=A2'·Pb') acting the responsive spool 124 is relatively small and the spring force Fs' of the spring 127 acts leftward, the following relation is established.

$$F1'(=A1'\cdot Pa')<F2'(=A2'\cdot Pb'+Fs')$$

However, when the load pressure increases, since the difference between the hydraulic propulsions f1' and f2' increases on the basis of the area difference between the pressure receiving areas A1' and A2', the above relationship changes as follows.

$$F1'\ (=A1'\cdot Pa')>F2'(=A2'\cdot Pb'+Fs')$$

Therefore, the responsive spool 124 moves rightward against the spring force of the spring 127, decreasing the opening area of the variable orifice 128.

The operation of the flow control device as constructed above is described hereinafter.

According as the steering wheel is rotated, the load pressure is increased. In accordance with the rise of the load pressure, the rightward hydraulic propulsion f1' is increased. And the difference of the hydraulic propulsions f1' and f2' between both ends of the responsive spool 124 is increased since the pressure receiving area A1' facing the metering orifice 22 is larger than the pressure receiving area A2'. When the difference of the hydraulic propulsions f1' and f2' exceeds the force of the spring 127, the responsive spool 124 is moved rightward against the spring 127, decreasing the opening area of the variable orifice 128. By closing the variable orifice 128, the communication between the pressure introduction port 35 and the pressure exhaust port 36 is closed, so that the pilot fluid rate released from the spring chamber 32 to the reservoir 38 is decreased to zero. Therefore, the pressure in the spring chamber 32 increases, so that the bypass spool 30 moves to narrow the opening area of the bypass passage 20, As the result, the flow rate of the operating fluid supplied to the control valve 63 increases to generate sufficient assistance force of the power steering apparatus.

Operation and effect of the flow control is valve having the bypass spool 30 is substantially the same as that of the first embodiment. Namely, since the differential pressure across the metering orifice 22 acts on the bypass spool 30, the opening of the bypass passage 20 is adjusted to maintain the differential pressure constant so as to maintain the flow rate of the operating fluid supplied from the pump 60 to the control valve 63 constant. In addition, the control rod 50 of the bypass spool 30 regulates the opening area of the metering orifice 22 in accordance with the rotational speed of the pump 60.

In cold temperature state such as cold area, the coefficient of viscosity of the operating fluid increases. The operating fluid with high coefficient of viscosity urges the responsive spool 124 against the spring force of the spring 127 even if the steering wheel is substantially in its neutral state. The operating fluid causes force to move the responsive spool 124 rightward in FIG. 9. This rightward force acts to narrow the variable orifice 128 like the hydraulic propulsions f1', so that the operating fluid supplied to the control valve 63 is increased to generate the assistance force of the power steering apparatus. Since the additional force generated by the operating fluid with high coefficient of viscosity acts to narrow the variable orifice 128, the assistance force of the power steering apparatus is sufficiently originated even when the flow control device is in cold temperature state. In addition, since the additional force narrows the variable orifice 129 even when the steering wheel is substantially in its neutral state, the flow control device keeps the flow rate supplied to the control valve 63 at the neutral state. The flow rate prevents the shortage of the assistance force of power steering when the rotation of the steering wheel is started. Therefore, the flow control device of the second embodiment prevents the shortage of the assistance force in cold temperature state.

[Third Embodiment]

Figure 10:
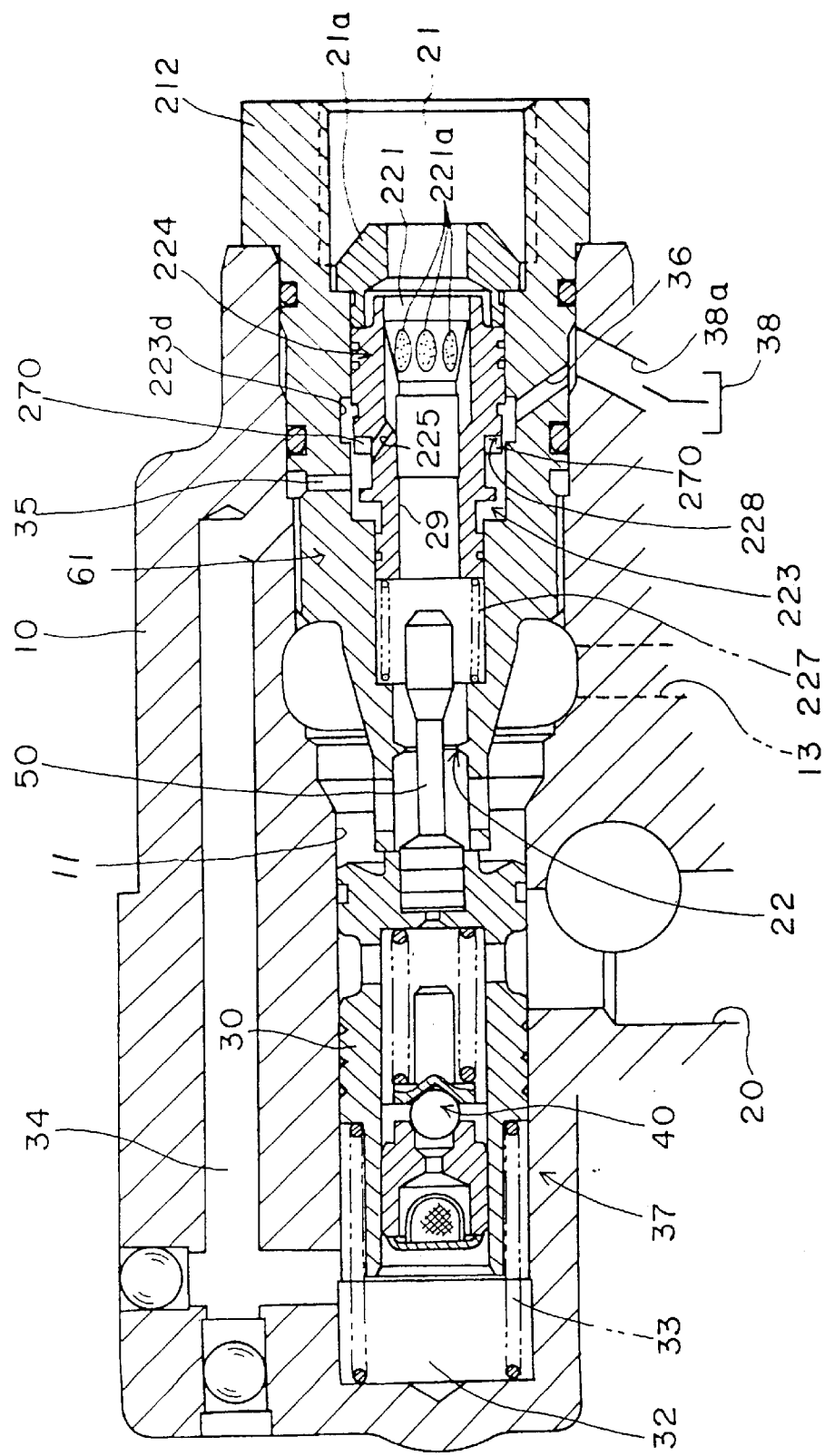
FIG. 10 is a sectional view of a flow control device of a third embodiment.
Figure 11:
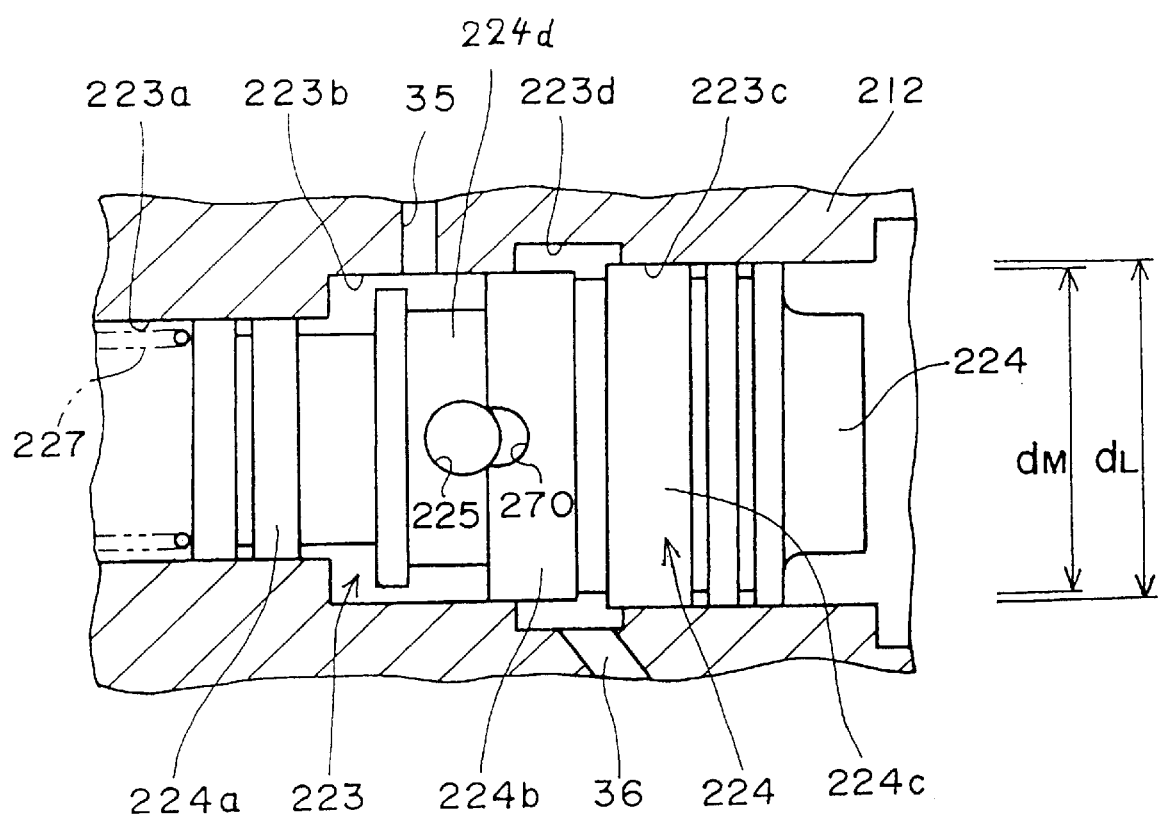
FIG. 11 is an enlarged view of a load pressure responsive valve of the third embodiment.
Figure 12:
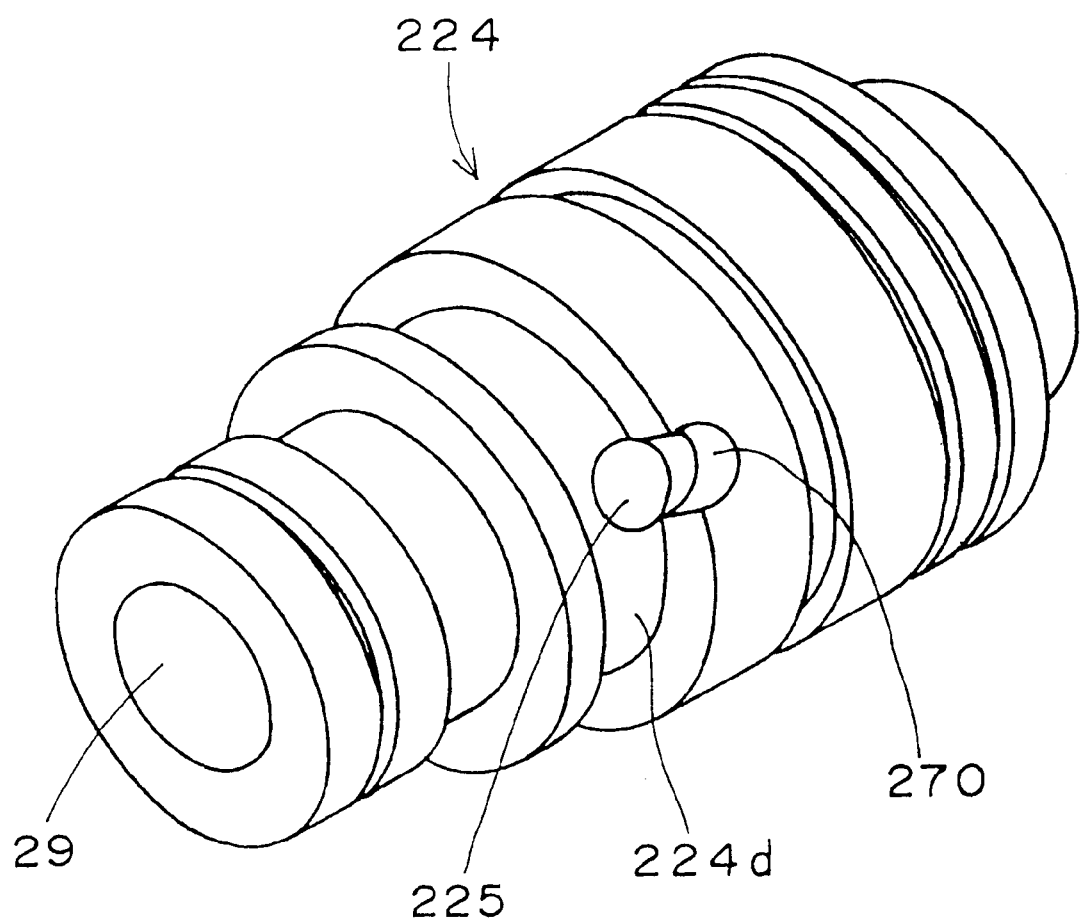
FIG. 12 is a perspective view of a load pressure responsive spool of the third embodiment.

FIGS. 10, 11 and 12 show another preferred embodiment of a flow control device. The flow control device is capable of preventing instability of the flow rate caused by foreign substance which jams in the variable orifice of the load pressure responsive valve.

The flow control device shown in FIG. 10 has two significant differences from the first embodiment. FIG. 10 is comparable to FIG. 2 for the first embodiment. Parts of the third embodiment, substantially same as those of the first embodiment, are noted by the same numerals of the first embodiment. Therefore, the description of these parts in the third embodiment is omitted. The other parts of the third embodiment, different from those of the first embodiment, are noted by different reference numerals.

One difference of the third embodiment is that a plurality of notches 270 forms a variable orifice 228 of a load pressure responsive spool 224 (hereinafter referred to as a responsive spool 224) shown in FIG. 11 to make a movement amount of the responsive spool 224 longer than that of the first embodiment. In the first embodiment, since the variable orifice 28 formed all over the circumferential edge of the responsive spool 24 shown in FIG. 4, the opening area per unit displacement of the responsive spool 24 is comparatively large, with the result that the responsive spool 24 moves in short range. Therefore, there is a possibility that foreign substances in the operating fluid jam the variable orifice 28 of the responsive valve 61. The foreign substances prevent the responsive spool 24 from moving smoothly, causing instability of the flow rate.

The other difference of the third embodiment is that a cylindrical filter member 221 is located in the responsive spool 224 to prevent the foreign substances from jamming the variable orifice 228. The detail of these differences is described hereinafter.

A union 212 has an outlet port 21 and a metering orifice 22. A stepped bore 223, formed between the outlet port 21 and the metering orifice 22, slidably receives the responsive spool 224.

The responsive spool 224 consists of a small spool portion 224a, a middle spool portion 224b and a large spool portion 224c, the diameter of which becomes larger in this order. Therefore, the diameter dL of the large spool portion 224c is larger than the diameter dM of the middle spool portion 224b, as shown in FIG. 11. The small spool portion 224a, the middle spool portion 224b and the large spool portion 224c are respectively located in a small bore 223a, a middle bore 223b and a large bore 223c of the stepped bore 223.

A pressure introducing passage 35 is formed in the middle bore 223b of the stepped bore 223 to penetrate to the union 212. An inner groove 223d is formed between the middle bore 223b and the large bore 223c of the stepped bore 223. A pressure exhaust port 36 is formed in the union 212 to be connected to the reservoir 38. The opening of the pressure exhaust port 36 is located on the inner groove 223d.

An outer groove 224d is formed between the small spool portion 224a and the middle spool portion 224b of the responsive spool 224. A control orifice 225 is formed in the outer groove 224d of the responsive spool 224 to penetrate to a through hole 29 of the responsive spool 224. Therefore, the through hole 29 of the responsive spool 224 connects with the spring chamber 32 of the flow control valve 37 through the control orifice 225, the pressure introducing passage 35 and the connection passage 34.

One or a plurality of notches 270, e.g. two notches, having a predetermined width is formed in the outer surface of the middle spool portion 224b of the responsive spool 224 to the outlet port 21. One of the notches 270 contacts with the opening of the control orifice 225. Each notch 270 faces a shoulder formed by the middle spool portion 224b and the inner groove 223d of the responsive spool 224. The shoulder and each of the notch 270 constitute a variable orifice 228.

Since the variable orifice 229 with the notch 270 is partly arranged around the responsive spool 224, the opening area per unit displacement of the responsive spool 224 becomes smaller than that of the responsive spool 24 of the first embodiment. Therefore, it is possible for securing enough opening area of the variable orifice 228 that an amount of the displacement of the responsive spool 224 is larger than that of the responsive spool 24 of the first embodiment.

To enlarge the amount of the displacement of the responsive spool 224, the length of the notch 270 in the axial direction of the responsive spool 224, the width of the notch 270 and the spring constant of a spring 227 urging the responsive spool 224 are appropriately designed.

The through hole 29 of the responsive spool 224 receives a cylindrical filter member 221 inserted from the side of the outlet port 21 and fixed in the inner surface of the through hole 29. A predetermined space facing the inner opening of the control orifice 225 is secured between the inner surface of the through hole 29 and the outer surface of the filter member 221. A plurality of net portions 221a is formed the side surface of the filter member 221 for filtering the operating fluid to remove the foreign substances caused by friction or wear of the elements of the flow control device, the pump 60 and the like. The net portion 221a is made up of wire net.

In the constructions described above, when the operating fluid is supplied to the control valve 63 through the through hole 29 of the responsive spool 224, the operating fluid passes through the filter member 221. Part of the operating fluid is led to the control orifice 225 after the foreign substances is removed from the operating fluid by the net portions 221a of the filter member 221. The foreign substances are brought to the side of the control valve 63. Therefore, it is prevented that the foreign substances directly enter into the control orifice 225.

In addition, since the responsive spool 224 with the notch 270 slides in larger distance, it is prevented that the foreign substances are easily removed from the variable orifice 229 even if the foreign substances enter in the variable orifice 228 through the control orifice 225.

Therefore, the flow control device of the third embodiment prevents instability of the flow rate caused by the foreign substance which jams in the variable orifice 228.

In the third embodiment, both the filter member 221 and the notch 270 for long spool stroke are provided to prevent the instability of the flow rate. However, it is possible that either the filter member 221 or the notch 270 is provided.

[Fourth Embodiment]

Figure 13:
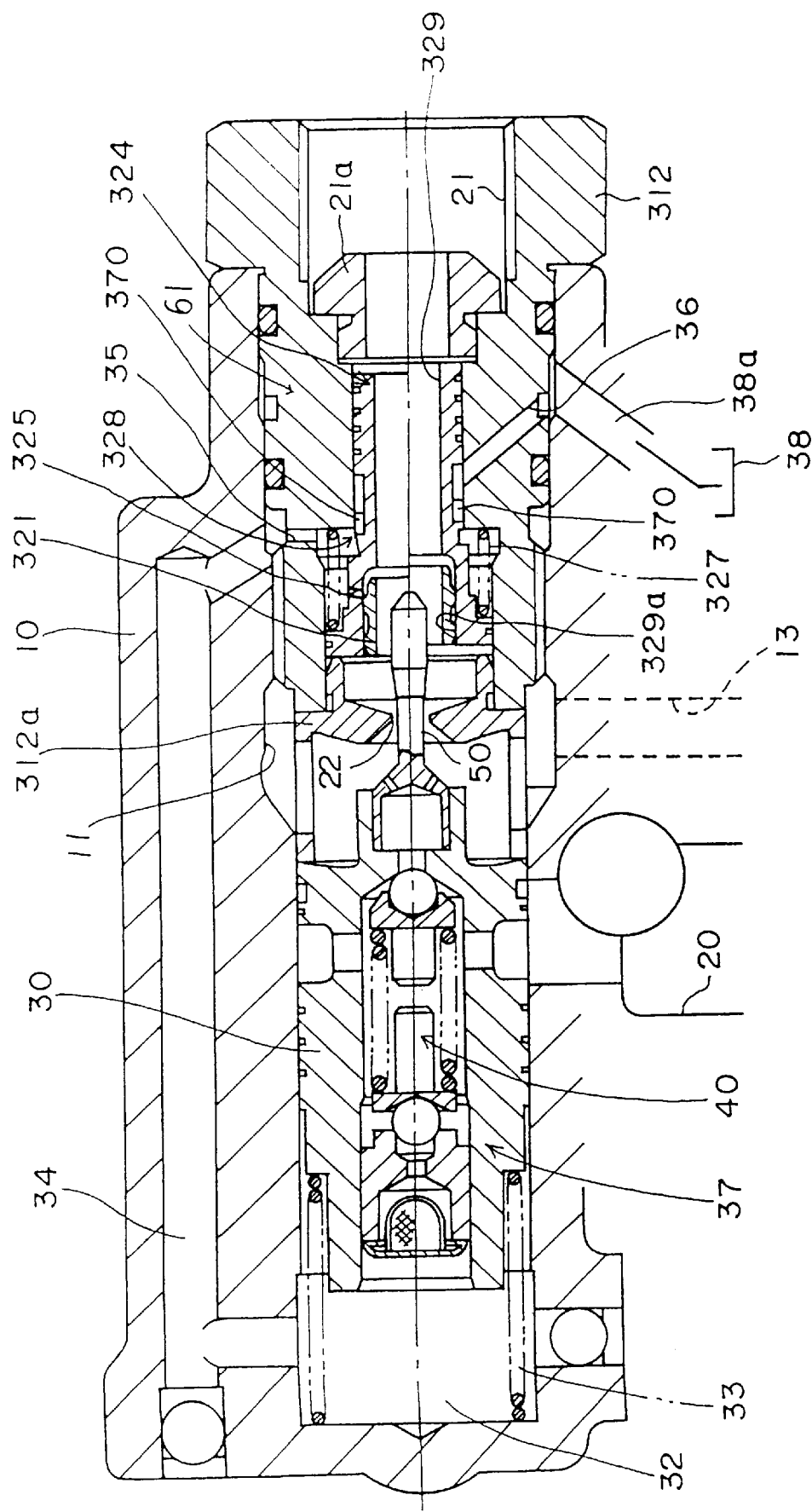
FIG. 13 is a sectional view of a flow control device of a fourth embodiment.
Figure 14:
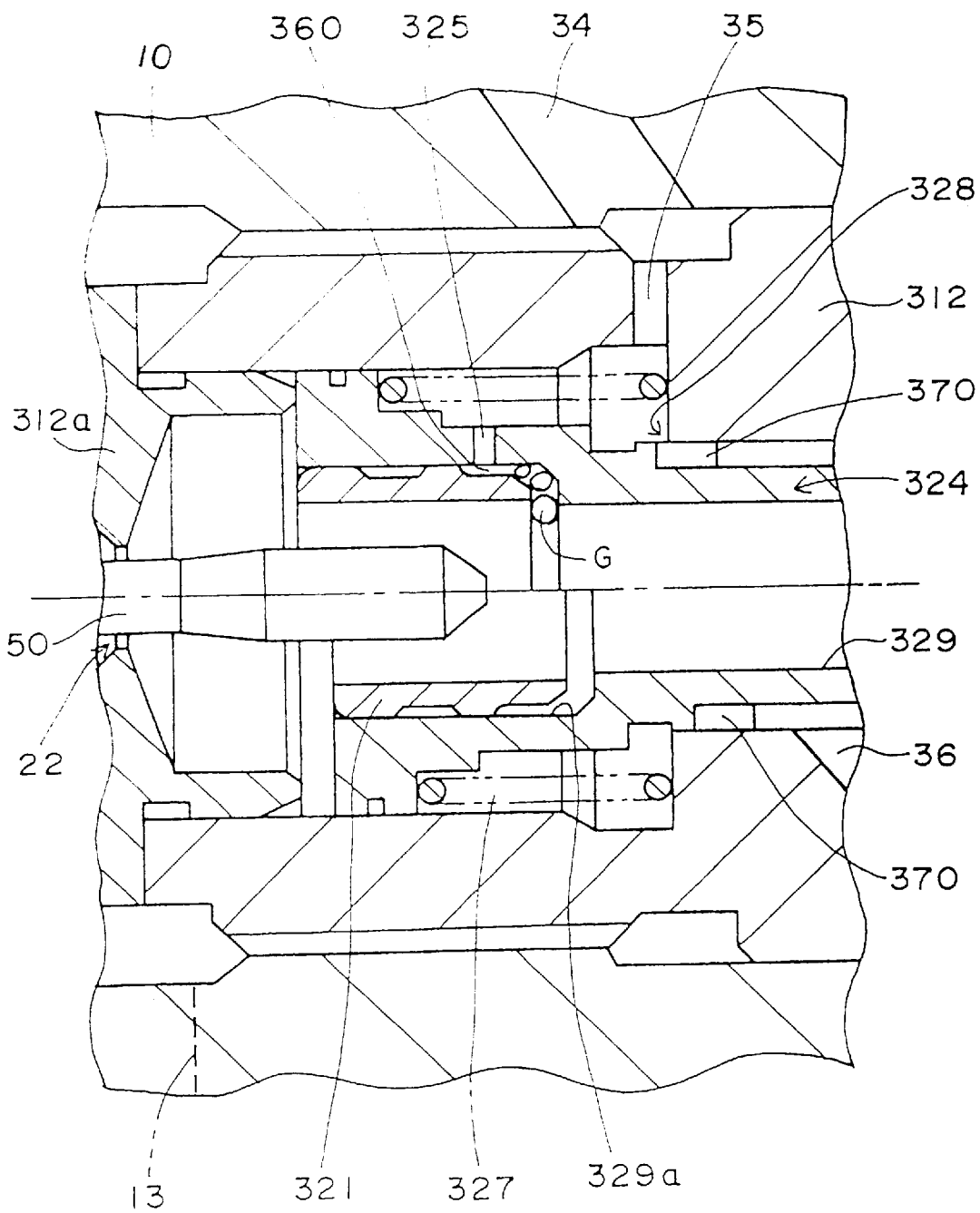
FIG. 14 is an enlarged sectional view of a load pressure responsive valve of the fourth embodiment.

FIGS. 13 and 14 show another preferred embodiment of a flow control device. The flow control device is capable of preventing shortage of assistance force for a power steering apparatus at low temperature as is similar to the second embodiment. Moreover, the flow control device is capable of preventing instability of the flow rate caused by foreign substance because the flow control device of the fourth embodiment has a filer member as is similar to the third embodiment.

FIG. 13 of the fourth embodiment is comparable to FIG. 2 of the first embodiment and FIG. 9 of the second embodiment. Parts of the fourth embodiment, substantially same as those of the first embodiment, are noted by the same numerals of the first embodiment. Therefore, the description of these parts in the fourth embodiment is omitted. The other parts of the fourth embodiment, different from those of the first embodiment, are noted by different reference numerals.

A load pressure responsive spool 324 of the fourth embodiment (hereinafter referred to as a responsive spool 324) is urged toward a metering orifice 22 by a spring 327. And a union 312 consists of two separate elements, which are a main-body of the union 312 and a sub-body 312a having the metering orifice 22. Since the responsive spool 324 is urged toward a metering orifice 22, the relationship of the pressure receiving areas of the responsive spool 324 is opposite to that of the first embodiment. The above construction is substantially the same as that of the second embodiment. Therefore, the flow control device of the fourth embodiment is capable of preventing the shortage of the assistance force in cold temperature state.

A through hole 329 of the responsive spool 324 has a large diameter portion 329a facing the metering orifice 22. The large diameter portion 329a receives a cylindrical filter member 321. As shown in FIG. 14, a predetermined space facing the inner opening of the control orifice 325 is secured between the inner surface of the large diameter portion 329a and the outer surface of the filter member 321. The space between the large diameter portion 329a and the filter member 321 is served as a leading path 360 for introducing the operating fluid to the control orifice 325.

The sectional area of the leading path 360 becomes smaller as the leading path 360 extends closer to the control orifice 325 since the inner edge of the filter member 321 facing the bottom surface of the large diameter portion 329a is formed in inclined shape in the outer surface thereof. The clearance formed between the inner edge of the filter member 321 and the bottom surface of the large diameter portion 329a is the largest portion in the sectional area of the leading path 360 as an opening of the leading path 360. Therefore, the leading path 360 gradually decreases in the sectional area toward lower part of the operating fluid led to the control orifice 325.

As is similar to the third embodiment, the variable orifice 328 is formed with notches 370 in the outer surface of the responsive spool 324. The notch 370 extends in the axial direction of the responsive spool 324, and is possible to communicate with a pressure exhaust port 36.

In the constructions described above, since the leading path 360 of the filter member 321 gradually decreases in the sectional area, the filter member 321 catches foreign substances G in the upperstream of the leading path 360. The foreign substances G are caught between the inner surface of the large diameter portion 329a and the outer surface of the filter member 321 as shown in FIG. 14. In addition, the filter member 321 copes with several sizes of the foreign substances G because of decrease of sectional area of the leading path 360.

Therefore, the filter member 321 prevents the foreign substance from entering into the control orifice 325 and jamming in the variable orifice 328, in order to avoid instability of the flow rate caused by the foreign substance. Moreover, the simple construction of the filter member 321 decreases manufacturing cost of filter member for removing the foreign substance.

What is claimed is:

1. A flow control device of a power steering apparatus comprising:

a valve receiving bore formed in a housing of a pump and connecting to a supply passage leading operating fluid discharged from said pump;

a union, arranged in said valve receiving bore, having a union bore connecting to said valve receiving bore;

a metering orifice arranged in said union bore;

a flow control valve, arranged in said valve receiving bore, having a spring chamber and a bypass spool for regulating an opening area of a bypass passage in accordance with pressure difference across said metering orifice, said spring chamber connected to a downstream side of said metering orifice in said union bore and connected to a reservoir, said bypass spool urged by a spring in said spring chamber, said bypass spool having a control rod penetrating said metering orifice for regulating an opening area of said metering orifice in accordance with a movement of said bypass spool; and a load pressure responsive valve, arranged in said union, for regulating communication between said spring chamber and said reservoir in response to a rise of load pressure of the operating fluid.

2. The flow control device of a power steering apparatus according to claim 1, further comprising a control valve having variable throttles arranged on paths connected to said pump, both fluid chambers of a power cylinder and said reservoir.

3. The flow control device of a power steering apparatus according to claim 1, wherein said control rod of said bypass spool has a small diameter portion, a taper portion and a large diameter portion.

4. The flow control device of a power steering apparatus according to claim 1, wherein said union bore has an outlet port for leading the operating fluid passed through said metering orifice, and a load pressure responsive spool of said load pressure responsive valve arranged between said outlet port and said metering orifice.

5. The flow control device of a power steering apparatus according to claim 4, wherein said load pressure responsive spool is urged by a spring toward said outlet port.

6. The flow control device of a power steering apparatus according to claim 4, wherein said load pressure responsive spool is urged by a spring toward said metering orifice.

7. The flow control device of a power steering apparatus according to claim 4, wherein said load pressure responsive spool has a filter member for filtering the operating fluid to remove foreign substance.

8. The flow control device of a power steering apparatus according to claim 7, wherein said filter member forms a leading path between an inner surface of said load pressure responsive spool and an out er surface of said filter member, said leading path decreasing in area downstream.

9. The flow control device of a power steering apparatus according to claim 4, wherein said load pressure responsive valve has a notch formed an outer surface of said load pressure responsive spool, and said load pressure responsive valve regulates the communication between said spring chamber and said reservoir through said notch.

* * * * *